United States Patent Office 3,349,867
Patented Oct. 31, 1967

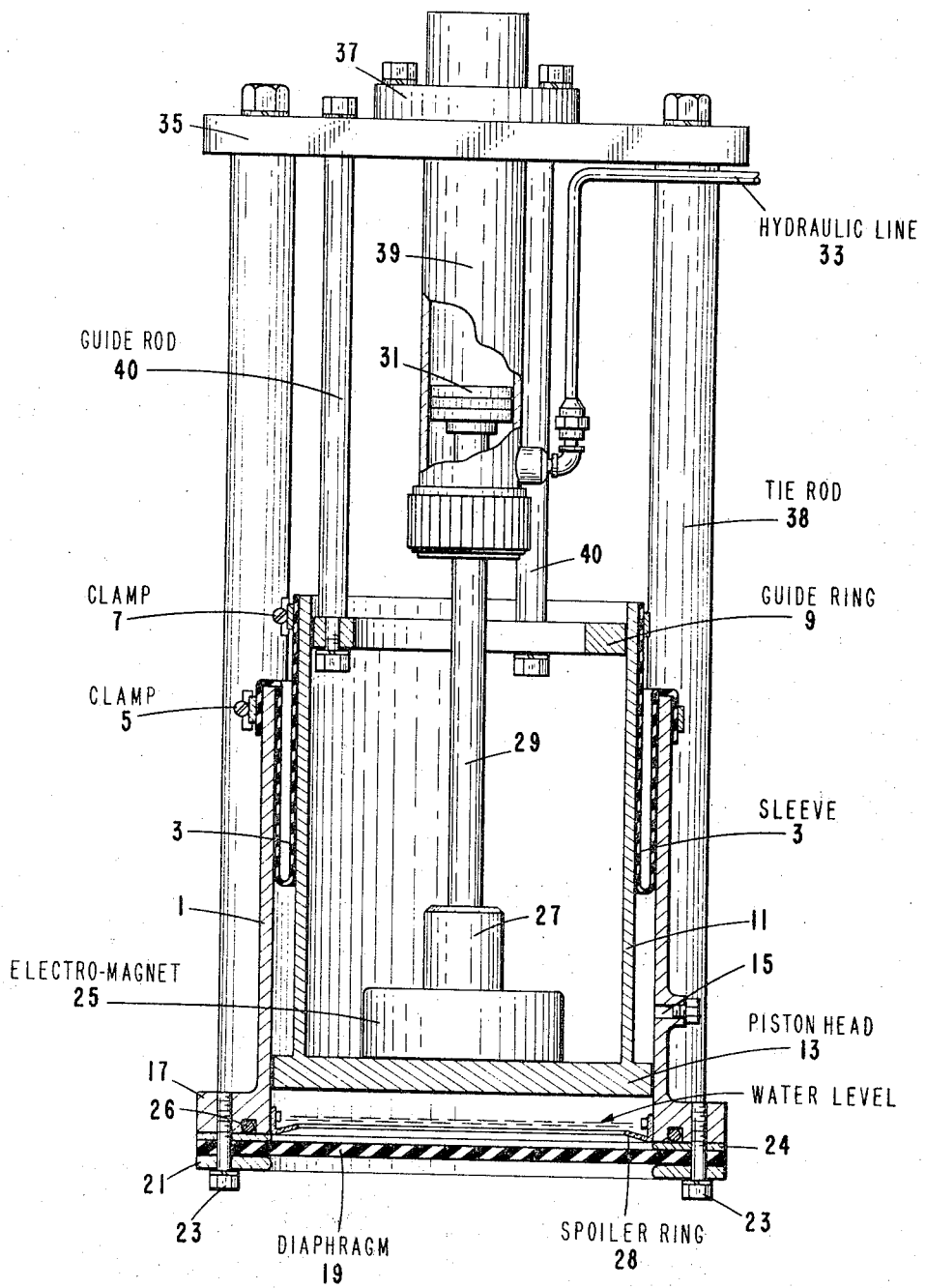

3,349,867
VACUUM ENERGIZED SEISMIC PULSE GENERATOR
Whitman D. Mounce, Houston, Tex., assignor to Esso Production Research Company, a corporation of Delaware
Filed Feb. 23, 1966, Ser. No. 529,446
1 Claim. (Cl. 181—.5)

ABSTRACT OF THE DISCLOSURE

A seismic pulse produced by lifting a piston and a flexible bottomed piston chamber to produce a vacuum slams the piston against the piston bottom when the piston is released. The piston is lifted by a hydraulically actuated piston connected thereto. A rolling, folded diaphragm provides vacuum-tight seal between piston and its cylinder.

---

The present invention is directed to a nonexplosive seismic source, and more particularly to a seismic source of the type wherein seismic waves are produced by means of a piston impacting the earth either directly or through a coupling medium under the impetus of a partial vacuum.

A number of nonexplosive seismic sources have been developed in recent years for producing seismic waves in connection with seismic exploration of the earth's subsurface. One type of such nonexplosive seismic source that has been suggested includes a piston driven against a coupling medium, such as water, to impact the earth under the impetus of a partial vacuum. For a number of reasons the various types of apparatus that have been developed in the past have not been entirely satisfactory.

In accordance with the teachings of the present invention, a piston is positioned in a piston chamber that is sealed at one end by a flexible diaphragm. A power piston and a power piston chamber are positioned relative to the first piston so as to move the first piston away from the diaphragm when the power piston is connected thereto under the impetus of hydraulic force exerted on the power piston. The two pistons are connected together by a rod connected to the power piston and an electromagnet means affixed to the rod for releasably connecting the rod to the first piston. Thus, when the electromagnet is energized, the power piston can pull the first piston away from the diaphragm to produce a partial vacuum in the portion of the first piston chamber defined by the chamber itself, the first piston, and the diaphragm. When the electromagnet is de-energized, the atmospheric pressure is effective to push the first piston towards the diaphragm with great force. When the piston impacts the diaphragm, assuming that the diaphragm is coupled to the earth, seismic waves of considerable magnitude will be produced.

One aspect of the invention comprises forming the piston as a piston head and a cylindrical piston wall member affixed at one end to the piston head and extending toward the power piston. The piston wall member is positioned to be substantially coaxial with the longitudinal axis of the first piston chamber. To effect a seal between the piston and the chamber, there is provided an annular flexible sleeve connected between the piston wall member and the first piston chamber, and extending to and folded in space therebetween. The sleeve extends toward the first piston so as to provide a substantially frictionless seal between the piston wall member 11 and the cylinder 1. The thickness of the sleeve is less than half the diameter of the gap between the piston wall member and the first piston chamber.

Objects and features of the invention not apparent from the above discussion will become evident upon consideration of the following detailed description of the invention taken in connection with the accompanying drawing wherein there is illustrated an elevational view, partially in cross section, of one embodiment of the invention.

With reference now to the figure, there is illustrated a first piston cylinder 1 sealed at one end by a diaphragm 19, which is affixed to a flange or base plate 17 formed on the lower end of cylinder 1 by means of an annular member 21 and a plurality of bolts 23. A retainer ring 24 may be positioned between the base plate 17 and the diaphragm 19. An O-ring 26 may be included for the purpose of insuring the seal between the retainer ring 24 and the base plate 17.

Positioned in the cylinder 1 is a piston including a piston head 13 and a piston wall member 11. The piston wall member 11 is affixed at one end to the piston head and extends away from the diaphragm 19. Cylinder 1 and piston wall member 11 have longitudinal axes that are substantially coaxial. For the purpose of insuring a seal between the cylinder 1 and the piston wall member 11, there is provided an annular flexible sleeve 3 extending over the upper end of cylinder 1 and affixed thereto by a hose clamp member 5 and further affixed to the upper end of piston wall member 11 by hose clamp member 7. Members 5 and 7 may be Breeze Aeroseal hose clamps. Flexible sleeve 3 is folded in and extends into the space between the piston wall member 11 and the cylinder 1 to provide a substantially frictionless seal therebetween. As mentioned above, the thickness of the sleeve is less than half the diameter of the gap between the piston wall member 11 and the cylinder 1.

For the purpose of moving or lifting the piston away from the diaphragm 19, there is provided a power cylinder 39 affixed to a top plate member 35 by means of mounting flange 37, a power piston 31 in the power cylinder 39, a hydraulic line 33 coupled to the power cylinder 39 beneath the power piston 31, and a piston rod 29 connected at one end to piston 31 and at the other end to an electromagnet 25 by means of a ram adapter member 27. Electrical leads (not shown) connect the windings of the electromagnet 25 to an external power source through a switch for selectively energizing the electromagnet. The top plate member 35 is connected to the base plate 17 of cylinder 1 by means of a plurality of the tie rods 38 so as to form a unitary structure between the power cylinder 39 and the cylinder 1.

A plurality of guide rods 40 are connected at one end thereof to top plate member 35 and extend toward the piston head 13. The guide rods are connected to a guide ring 9 which slidingly engages the inner surface of the piston wall member 11 so as to keep the piston wall member correctly aligned. Alternatively, the guide ring 9 can have a plurality of matching holes drilled therein so as to slidingly engage the guide rods 40, in which case the guide ring 9 will be affixed to the piston wall member 11.

A small port 15, which is normally plugged is provided in the side of the cylinder 1. When the apparatus described above is assembled, the piston head 13 and piston wall member 11 is kept at the upper end of the stroke thereof. With the plug removed, a small amount of water is introduced into the chamber between diaphragm 19 and piston head 13 through the port 15 in order to provide a hydraulic coupling between the piston head 13 and the diaphragm 19. A partial vacuum is then placed on the chamber by means of a suitable vacuum pump coupled to the port 15. This will suck the rubber sleeve 3 into the space between the cylinder 1 and the piston wall 11. The piston head 13 and piston wall 11 can now be lowered, and the vacuum within the chamber will keep the sleeve 3 neatly folded in place against the inner surface of cylinder 1 and the outer surface of piston wall 11. This obviates the possible use of an O-ring or other friction-type seals between the piston and its cylinder.

The apparatus described above is normally placed in a pool or puddle of water when it is used at non-marine locations to provide coupling to the earth. At marine locations the apparatus may be partially submerged. Also, the apparatus may be housed in a submarine adapted to be towed by a surface vessel.

With the plug in port 15 in place, the windings of electromagnet 25 are energized from a suitable external source so that the piston head 13 is raised with piston 31 by hydraulic pressure exerted on the underside of piston 31 through line 33. As the piston head 13 is raised, an increasingly large vacuum will be produced in the chamber between diaphragm 19 and the piston head. At the top of the stroke of piston 31, the windings of the electromagnet 25 are de-energized as by opening a switch between the windings and the external electrical source. Piston head 13 and piston wall member 11 will be released, and under the impetus of the vacuum, the piston head 13 will be driven down by the atmospheric pressure to impact the water in the chamber, thus striking diaphragm 19 a mighty blow to produce seismic waves between the water coupling the diaphragm 19 to the earth's surface.

In the above discussion, the term "earth" is meant to include water-covered areas such as lakes and seas, as well as the ground itself.

An electrical switch on a conventional seismic recorder can be used for opening the connection between the windings of the electromagnet 25 and the external power source. Since the time between the energization of the electromagnet and the production of seismic waves by the piston head striking the water above diaphragm 19 will be relatively constant, the opening of the switch can be used as the "break time" or reference time on seismograms produced as a result of seismic waves resulting from the impact of piston head 13 on the earth through the diaphragm 19 and the water coupling media.

The diaphragm 19 may be made of fabric-reinforced rubber. When a partial vacuum is produced by raising the piston head 13, the diaphragm 19 will bulge into the chamber. It usually will be found to be desirable to use a diaphragm that has been reinforced with canvas to minimize the chances of the diaphragm rupturing.

It is desirable to connect a small, flexible, narrow annular flange 28 to the inner surface of cylinder 1 immediately above the diaphragm 19. This flange may be of nylon and is for the purpose of preventing damage to the diaphragm 19 by the shearing action of the water in the chamber. In effect, flange 28 acts as a spoiler ring.

The invention is not necessarily to be restricted to the specific structural details herein set forth, as various modifications thereof may be effected without departing from the spirit and scope of the invention.

What is claimed is:

A seismic source, comprising:
a first cylinder;
a flexible diaphragm sealing one end of said first cylinder;
a first piston in said first cylinder for bidirectional movement therein;
a power piston cylinder;
a power piston in said power piston cylinder;
a rod connected to said power piston and extending toward the side of said first piston opposite the side of said first piston facing said diaphragm;
electromagnet means affixed to said rod for releasably connecting said rod to said first piston;
means for hydraulically moving said power piston through said power piston cylinder to move said first piston away from said diaphragm whereby a partial vacuum is produced in the portion of said first cylinder between said first piston and said diaphragm;
said first piston including a piston head and a cylindrical piston wall member affixed at one end to said piston head and extending toward said power piston and substantially coaxial with the longitudinal axis of said first cylinder;
an annular, flexible sleeve connected between said piston wall member and said first cylinder, and folded and extending into the space therebetween toward said piston head to provide a substantially frictionless seal, the thickness of said sleeve being less than half the diameter of the gap between said first cylinder and said piston wall member,
an end plate connected to said power piston cylinder and to said first cylinder, guide rod means connected to said end plate and extending toward said first piston, and a guide ring affixed to the end of said guide rod means and slidably engaging said piston wall.

References Cited
UNITED STATES PATENTS

| | | | |
|---|---|---|---|
| 1,753,368 | 4/1930 | Du Bois-Reymond et al. | 181—.5 |
| 2,620,766 | 12/1952 | Seavey | 181—.5 |
| 2,731,534 | 1/1956 | Hansen et al. | 92—93 X |
| 2,898,084 | 8/1959 | Eckel et al. | 181—.5 |
| 3,189,121 | 6/1965 | Vander Stoep | 181—.5 |
| 3,277,977 | 10/1966 | Silverman | 181—.5 |

BENJAMIN A. BORCHELT, *Primary Examiner.*

G. H. GLANZMAN, *Assistant Examiner.*